United States Patent [19]
Yagi

[11] Patent Number: 5,871,085
[45] Date of Patent: Feb. 16, 1999

[54] DRIVING APPARATUS FOR A COMPACT BELT CONVEYER

[75] Inventor: Shigeru Yagi, Tokyo, Japan

[73] Assignee: Sanki Engineering Co., Ltd., Tokyo, Japan

[21] Appl. No.: 689,151

[22] Filed: Jul. 30, 1996

[30] Foreign Application Priority Data

Aug. 2, 1995 [JP] Japan .................................... 7-215499
Feb. 14, 1996 [JP] Japan .................................... 8-049611

[51] Int. Cl.$^6$ .................................................. B65G 23/04
[52] U.S. Cl. ........................................................ 198/835
[58] Field of Search ..................... 198/832, 835

[56] References Cited

U.S. PATENT DOCUMENTS

| | | | |
|---|---|---|---|
| 1,944,296 | 1/1934 | Nyborg ..................................... | 198/835 |
| 3,993,185 | 11/1976 | Fleckenstein ........................... | 198/813 |
| 5,316,125 | 5/1994 | Matsushima ........................... | 198/465.2 |
| 5,332,083 | 7/1994 | Axmann . | |
| 5,456,349 | 10/1995 | Axmann ............................... | 198/835 X |
| 5,562,199 | 10/1996 | Fisher ..................................... | 198/835 |

FOREIGN PATENT DOCUMENTS

| | | | |
|---|---|---|---|
| 1235096 | 2/1967 | Germany ............................... | 198/835 |
| 60-132812 | 7/1985 | Japan . | |
| 5-24652 | 6/1993 | Japan . | |
| 1288130 | 2/1987 | U.S.S.R. ................................. | 198/835 |
| 1402513 | 6/1988 | U.S.S.R. ................................. | 198/835 |
| 502617 | 3/1939 | United Kingdom . | |
| 552074 | 3/1943 | United Kingdom . | |
| 555216 | 8/1943 | United Kingdom . | |
| 2 273 692 | 6/1994 | United Kingdom . | |

*Primary Examiner*—James R. Bidwell
*Attorney, Agent, or Firm*—Jacobson, Price, Holman & Stern, PLLC

[57] ABSTRACT

The belt driving device of the present invention has left and right frames (5, 15) which upper ends are connected by a slide bed (16), an endless belt (20) being latched by a head pulley (21) which is disposed on a head end of frames (5, 15) and a tail pulley (21) disposed on a tail end thereof, and an actuator unit (12) of the belt detachably mounted on the frame under side. A drive pulley (30) is disposed in the actuator unit (12) and is supported by a frame body with a rubber spring so as to contact with an outer surface on the return side belt and inner pulleys (23, 24) are disposed on the frame under side at the actuator unit attaching position so as to contact with the return side belt inner surface. The drive pulley (30) is always pressed and energized to the inner pulley side by the rubber spring and the belt supported between the inner pulley and the drive pulley (30) is friction actuated by pressing the drive pulley from the belt outside. The take-up device can be eliminated from the device by pressing the drive pulley to the belt side.

11 Claims, 10 Drawing Sheets

DRIVING APPARATUS FOR A COMPACT BELT CONVEYER

FIELD OF THE INVENTION

The present invention relates to a driving apparatus for a compact belt conveyor on which a belt provided between an inner pulley and a drive pulley is friction actuated by the drive pulley.

BACKGROUND OF THE INVENTION

The compact belt conveyor in which a forward side of an endless belt is slid and actuated on a slide bed has been much used for conveying small products or bulk products. In a conventional driving system, belt tension is caused by winding the belt on the drive pulley side and a conveying torque is reduced due to belt extension, and it has been necessary to keep the tension on the belt by additionally providing a take-up apparatus.

When the belt conveyor has been used for a feeder conveyor around a manufacturing machine of food products and medical products, a conveying surface and a periphery thereof must be always kept clean and are sometimes or normally cleaned when it becomes dirty. There has been no problem for cleaning the belt surface, however complete cleaning or sweeping of a belt rear surface or of a roller periphery can not be achieved without removing the belt from the frame or the roller.

In this kind of the conventional conveyor, since the forward side of the belt is always slid on the slide bed, the belt is easily damaged, and needs to be replaced. For replacing the belt, the frame provided with the roller is removed from the substructure or a main roller such as an end roller must be removed from the frame. Therefore it is disclosed by Japanese Utility Model Registration Application Publication No. Hei 5-24652 that the frame is mounted to open freely on one side of the substructure, normal conveying is performed by closing the frame, and the belt can be removed when the frame is opened upwardly.

The system disclosed by the above Japanese Publication is actuated by tension of the belt wound to the drive pulley, the conveying torque is reduced by belt extension, and it is necessary to keep the belt tension by additionally providing the take-up apparatus and the damage of the belt is caused proportionally, and the belt replacement must be practiced many times.

SUMMARY OF THE INVENTION

Accordingly, it is an object of the present invention to provide a driving apparatus for a compact belt conveyor which requires no take-up apparatus. It is further object of the present invention to provide a driving apparatus for driving the belt by pressing the drive pulley or the inner pulley to the belt side to place the belt between rollers.

This and other object of the present invention are attained by a driving apparatus for a compact belt conveyor comprises a frame: belt retainer members mounted on frame head and tail ends; an endless belt provided (latched) between belt retainer members; a belt actuator unit detachably provided at a determined position of the frame under portion and having a drive pulley contacting with the return side belt outer surface of an endless belt and a speed reduction mechanism provided motor to actuate the drive pulley; at least one of inner pulleys provided on the frame under portion corresponding to the actuator unit attachment position to contact with the return side belt inner surface; and pressing means disposed between the inner pulley and the drive pulley to elastically press the belt between both pulleys to the inner pulley from the drive pulley side or to the drive pulley from the inner pulley side.

The head belt retainer and the tail belt retainer are respectively anti-rotational belt slip type guides which are fixed on or detachably provided into the frame end, or may be rollers supported on the frame end or pulleys detachably provided into the frame end. Upper end portions of left and right frame members are connected by a slide bed and it may be designed that a plurality of carrier rollers are disposed between opposite left and right frame members with a certain spaces.

Further the compact belt conveyor is characterized in that the frame is detachably disposed on the upper portion of the actuator unit via a screw and a catch clip and the head belt retainer and the tail belt retainer are provided on respective head and tail of the frame to receive the endless belt; the drive pulley contacting with an outer surface of the return side belt is supported by a spring member provided movable frame body, at least one of inner pulleys contacting with the inner surface of the return side belt is provided on the frame under portion where the actuator unit is attached; the drive pulley is always energized and pressed to the inner pulley side by the spring member and the belt between the inner pulley and the drive pulley is friction actuated by pressing the drive pulley from the belt out side.

The spring member is a flat spring in which one edge is fixed on the support frame of the actuator unit and the other edge is set free end for loading the motor and the drive pulley.

Furthermore the compact belt conveyor is characterized in that the frame is detachably disposed on the upper portion of the actuator unit and the head pulley and the tail pulley are provided on the head and tail of the frame; the drive pulley contacting with the outer surface of the return side belt is supported by the rubber spring provided movable frame body and at least one of inner pulleys contacting with the inner surface of the return side belt is provided on the frame under portion where the actuator unit is attached; the drive pulley is always energized and pressed to the inner pulley side by the rubber spring, and the belt between the inner pulley and the drive pulley is friction actuated by pressing the drive pulley from the belt outside.

The drive pulley is always energized to have an upward tendency by the rubber spring, and it upward angle is adjusted by a stopper bolt.

The rubber spring is composed of a metal made square cylindrical inner and outer shells and a cylindrical shape rubber body, the inner shell is concentrically inserted into the outer shell in a condition of having a displacement of 45°, several of rubber bodies (four pieces) are pressed between each edge of the inner shell and the corner portion of the outer shell. The spring characteristic is non-linear type and a cylindrical rubber body is rotationally compressed to actuate the spring, and the movable actuation is certainly transmitted to absorb the vibration and the noise simultaneously. The torsion angle of ±30° is acceptable and the torsion rigidity increases with the load increasing. The inner friction of the rubber body is 1000 times and over compared with the one of metal such as spring steel, and an early halt of the vibration due to the amplitude decreasing in the resonance and the impact.

The belt retainer, the carrier roller, the inner pulley, the drive pulley and the slide bed respectively have concave grooves at the center, correspondingly a convex slip is provided at a center of the longitudinal direction of the endless belt rear surface to engage in the concave groove so as to prevent the snaking of the belt, while those concave groove and the convex slip are not necessary for the apparatus.

The another type actuator unit includes a motor and a gear box attached in the longitudinal direction of the movable frame body, the drive pulley is fixed by projecting rotation shafts from left and right of the gear box, and several of catch clips having a spring and an engaging pawl are provided between T groove of the frame lateral side and a side plate of the actuator unit, thereby the apparatus has a construction that the frame and the actuator unit are detachably assembled with each other.

The speed reduction mechanism provided motor and the drive pulley are disposed in the support frame of the actuator unit, a chain is provided between a sprocket of an output shaft of the speed reduction mechanism provided motor and a sprocket provided on the drive pulley shaft, the inner pulley and the pressing pulley are provided on the frame on the portion where the actuator unit is attached, the inner pulley is disposed at oblique under portion of the drive pulley to wind the belt in a range of an almost angle of 135° around the periphery surface of the drive pulley, and the apparatus may have a construction that the frame and the actuator unit are detachably assembled with each other by catch clips which are provided between the drive pulley shaft and the side plate of the support frame with having an inclination of almost 45° in respect of a vertical line including the drive pulley shaft line so as to press the drive pulley from the belt outside.

One of inner pulleys is provided on almost center of the frame under side and it is possible to hold the belt by the inner pulley and the drive pulley in the actuator unit and the belt may be held by the head pulley on the frame tail end and the drive pulley in the actuator unit.

The apparatus has a construction described hereinbefore, the belt held between the inner pulley and the drive pulley is friction actuated by pressing the drive pulley from the belt outside. The actuator unit and the frame are separated from each other by removing the screw fastening them, thereby the belt is loosened to be removed from the frame , both surfaces of the belt can be cleaned and determined portions of the frame and the actuator unit can be also cleaned and checked to maintain. Those equipment are assembled again with each other to be used. The drive pulley is pressed and contacted with the inner pulley side by the rubber spring to friction actuate the belt outside, and no take-up device is necessary for the apparatus to achieve a compact construction thereof.

DETAILED DESCRIPTION OF THE PREFERRED EMBODIMENTS

Figure 1:
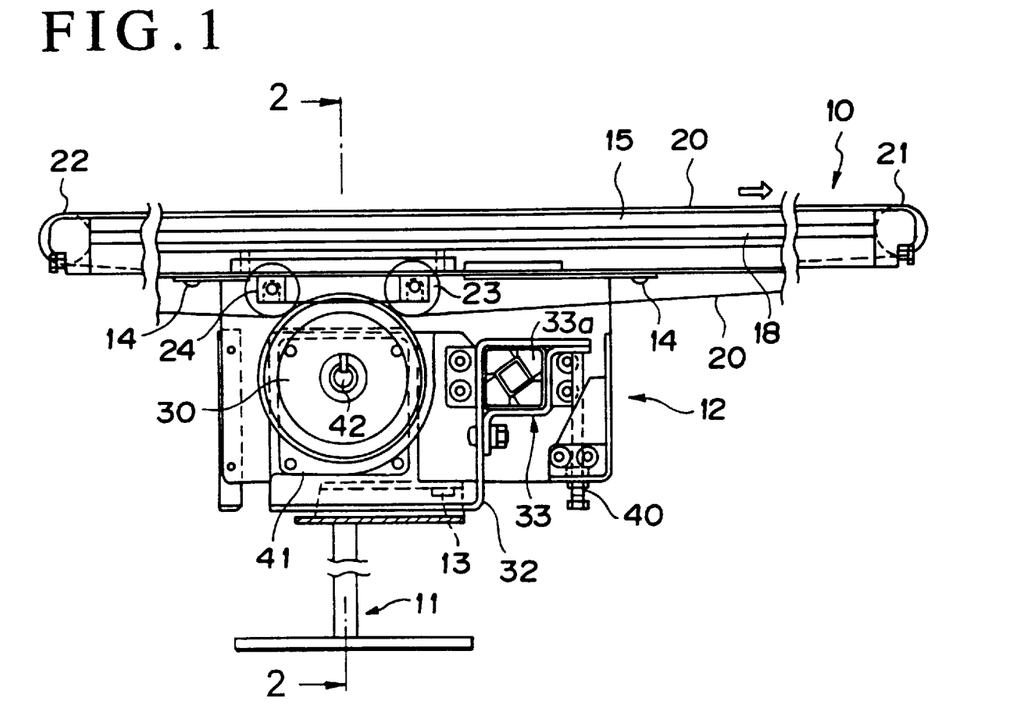
FIG. 1 is a side view of the first embodiment of a driving apparatus of the present invention.
Figure 2:
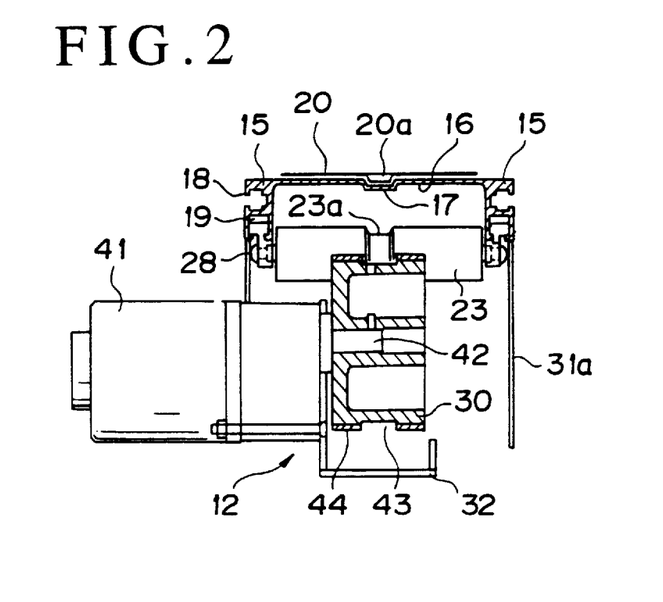
FIG. 2 is a horizontal cut-away front view along a line 2—2 in FIG. 1.

The principle of the present invention will be described in conjunction with accompanied drawings. FIG. 1 to FIG. 5 indicate the first embodiment of a driving apparatus for a compact belt conveyor and FIG. 1 illustrates a side view of the apparatus and FIG. 2 illustrates a horizontal cut-away front view along a line 2—2 in FIG. 1.

(Whole Structure of the Compact Belt Conveyor Driving Apparatus)

As illustrated, an actuator unit 12 is secured (fixed) on a foot unit 11 by a screw 13 and a frame 15 is detachably disposed on the unit. A head belt retainer member (or a head pulley) 21 and a tail belt retainer member (or a tail pulley) 22 are provided at the head and the tail portion of the frame 15 respectively and an endless belt 20 is linked between both belt retainer members to comprise a compact belt conveyor.

The foot unit 11 is not limited to the embodiment illustrated by above drawings. Further a supplemental foot unit (not shown) may be detachably mounted on the frame 15 which is separately located from the actuator unit 12 so as to support the frame with cooperating with the foot unit 11.

The head belt retainer member 21 and the tail belt retainer member 22 which are fixed on the frame end are formed in the pulley shape as illustrated, however they may be taken the place of an anti-rotational sliding guide to be detachably set in a notch or a groove (not shown) provided on the frame inside.

As illustrated by a section view of FIG. 2, the frame 15 has T grooves 18, 19 respectively on the side surface and the under surface thereof, a slide bed 16 is integrally formed between both sides frame bodies. Inner pulleys 23, 24 are disposed in the actuator unit mounting area on the frame under portion to contact with the return side belt inner surface. These inner pulleys 23, 24 are fixed on the frame under portion by a bearing fitting 28 mounted in T groove 19 of the frame under surface. In the frame 15 as illustrated, upper ends of the left and right frame members are connected by the slide bed 16, while a plurality of carrier rollers (not shown) may be disposed between opposite left and right frame members with a space.

A drive pulley 30 contacting with an outer surface of the return side belt is disposed in the actuator unit 12. This drive pulley 30 is always pressed and energized to the inner pulley by a rubber spring 33a as described hereinafter. The belt 20 is held by inner pulleys 23, 24 and the drive pulley 30 and the belt 20 held therebetween is friction actuated by pressing the drive pulley from belt outside.

Figure 9:
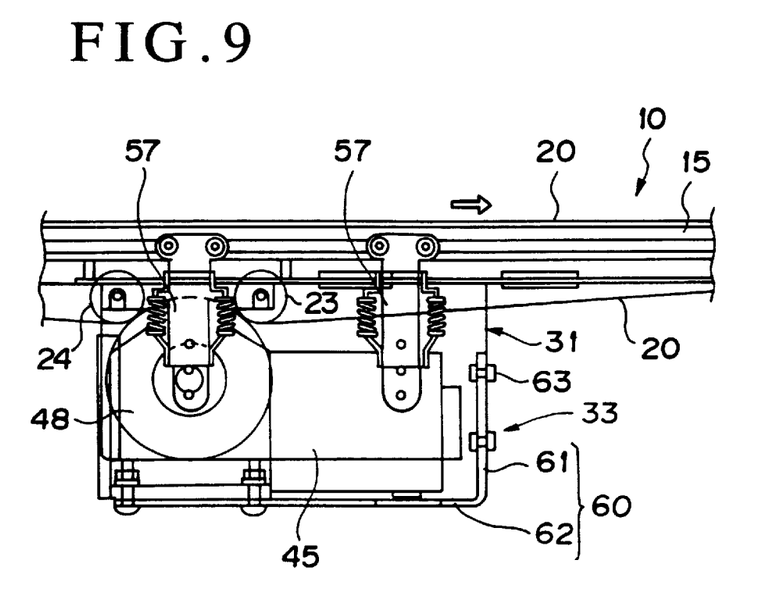
FIG. 9 is a side view of the third embodiment of the apparatus.

The actuator unit 12 comprises the drive pulley 30, a support frame 31, a movable frame body 32, a rubber spring 33a, pressing means 33 such as a flat spring 60 (as illustrated by FIG. 9 described hereinafter) and a motor 41 provided with a speed reduction mechanism.

Figure 4:
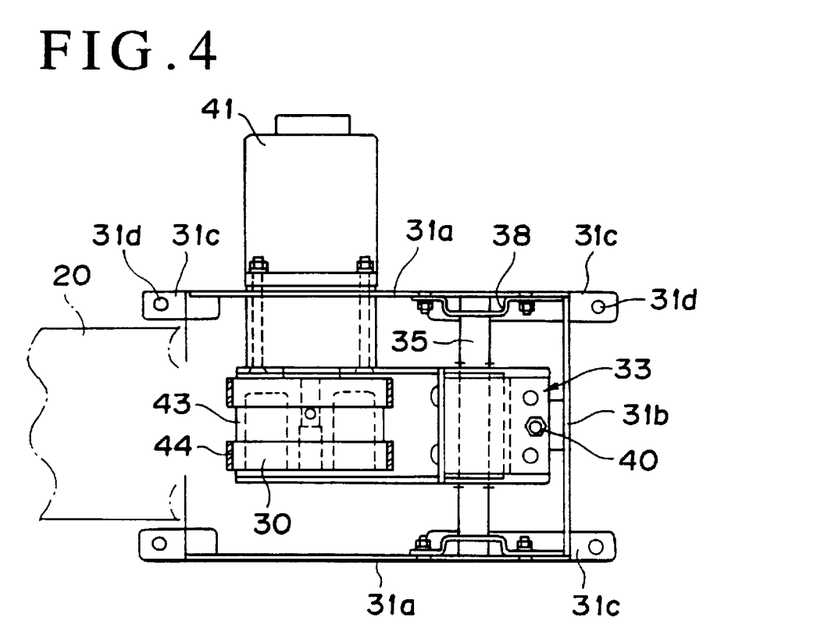
FIG. 4 is a bottom view of the actuator unit removed from the frame.
Figure 11:
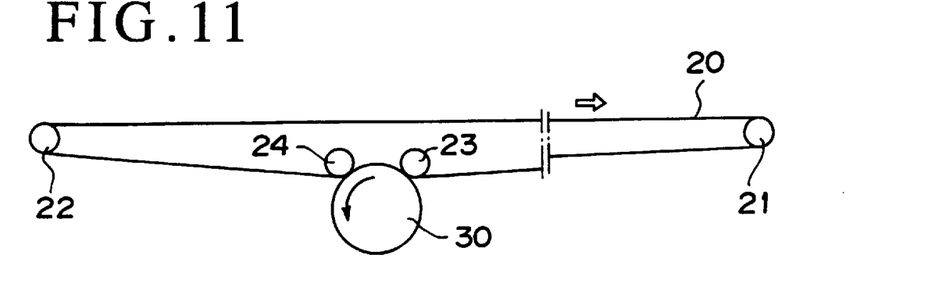
FIG. 11 is a skeleton side view of the first to the third embodiments of the apparatus.

The support frame 31 is formed by left and right side plates 31a, a connecting plate 31b and a plate 31c provided at the corner of both side plates 31a (FIG. 4). Each plate 31c has a screw hole 31d to receive a screw 14 so as to assemble the actuator unit 12 on the frame 15. The movable frame body 32 is provided on the support frame 31 and is always energized to have upward tendency by a torsion torque of the rubber spring 33a as described hereinafter and the speed reduction mechanism provided motor 41 and the drive pulley 30 fixed on an output shaft 42 of the motor 41 are attached on the movable frame body 32. A concave groove 43 is provided on the center of the periphery of the drive pulley 30 to engage in a convex slip 20a of the belt rear surface, further friction surfaces 44, 44 are formed both sides of the drive pulley by bonding urethane resin. FIG. 11 illustrates a skeleton side view of the first embodiment of the apparatus.

The rubber spring (spring member) 33a is formed by pressing four cylindrical rubber bodies 37 in the metal made inner and outer shells 35, 36 assembled having a dislocation of 45° from a rotational surface of the outer shell 36 shaft center. By a nonlinear characteristic of the rubber spring, the cylindrical rubber body 37 is rotationally compressed by adding a relative torsion force to inner and outer shells. Therefore the inner shell 35 is fixed and the outer shell 36 is to be set free, and the fluctuating action of the apparatus can be certainly transmitted and simultaneously the vibration and the noise can be absorbed. Further the apparatus has much of elasticity and the advantage of less permanent deformation, is durable for an impact load, and has much of durability.

By the spring characteristic of the rubber spring 33a, a torsion angle can be acceptable within a range of ±30° and as the load increases, a torsion rigidity increases proportionally. The torque characteristic is determined by a length of the inner and outer shells and of the cylindrical rubber body. Further as a damping characteristic, the rubber body has over 1000 times inner friction as compared with a metal such as a spring steel, and the vibration due to an amplitude deteriorate in a resonance and to an impact can be stopped earlier.

As described hereinbefore, the movable frame body 32 is supported by the rubber spring 33a so that both ends of the inner shell 35 of the rubber spring 33a are fixed on side plates 31a, 31a of the actuator unit 12 respectively via an attachment hardware 38 and the outer shell 36 is held by both of bending hold portion 34 formed on the movable frame body 32 and supporting member 34a opposite to the hold portion 34. A flange 39 is formed by extending end portions of the holding portion 34 and of the holding member 34a and a stopper bolt 40 is erected from a connecting plate 31b side to contact with the flange 39. The upper limit angle of the movable frame body 32 is controlled by the stopper bolt 40 to enable an easy assembling of the frame 15 and the actuator unit 12 so that an exceed erection of the drive pulley 30 supported by the movable frame body is suppressed.

The drive pulley 30 and pulleys 23, 24 respectively have a concave grooves 43, 23a, 24a on a periphery surface of the pulley center, and correspondingly a convex slip 20a is provided at the center of a length direction of the rear surface of the endless belt 20 to engage in the concave grooves of the pulley side so as to enable of preventing a belt snaking. Concave grooves are also formed on belt retainers 21, 22 and on the carrier roller or the like, however these concave grooves and the convex slip can be eliminated in case of less snaking of the belt.

(Actuation)

A actuation of the belt will be described.

The belt 20 between the inner pulleys 23, 24 and the drive pulley 30 is friction actuated with a certain torque by pressing the drive pulley 30 from belt outside, and products on the belt are conveyed in a direction indicated by an arrow illustrated in FIG. 1.

Conventional driving system by pressing the belt to the drive pulley side needs the take-up device to effect a belt tension, however in the present apparatus, the additional attachment of take-up device can be eliminated by pressing the drive pulley 30 to the belt side.

Figure 3:
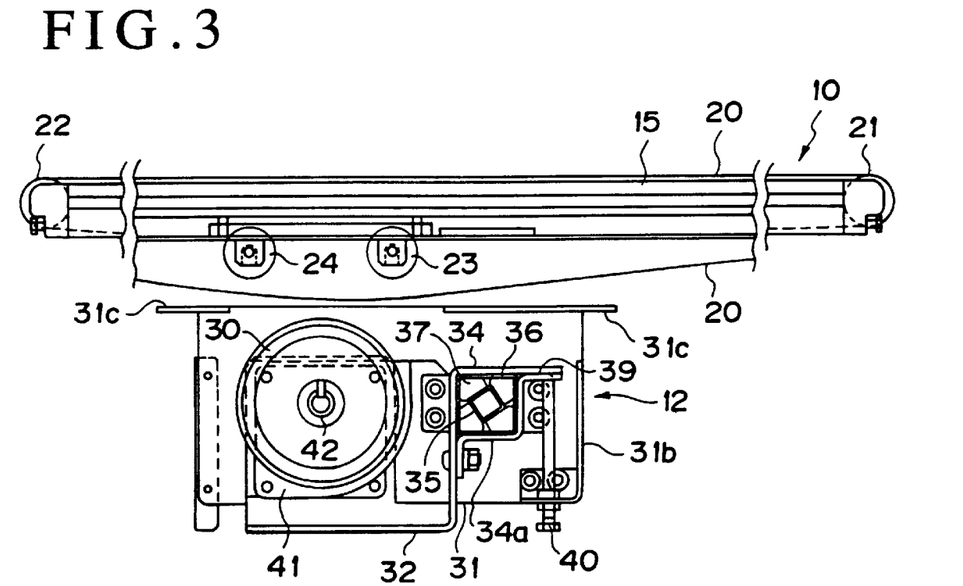
FIG. 3 is a side view of the apparatus which actuator unit is eliminated from a conveyor frame of the apparatus shown in FIG. 1.
Figure 5:
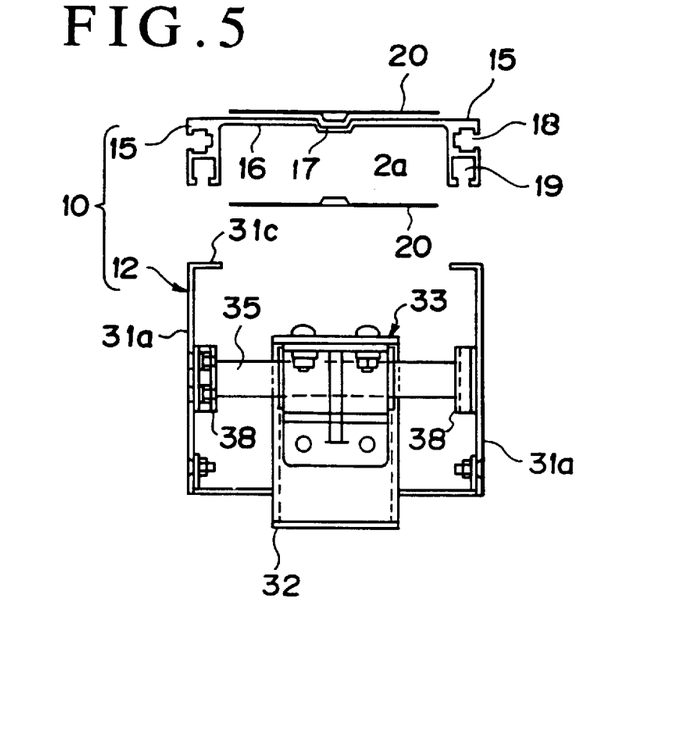
FIG. 5 is a horizontal cut-away front view of the apparatus shown in FIG. 3.

The actuator unit 12 and the frame 15 can be separated from each other by detaching the screw 14 which fastens them. FIG. 3 is a side view of the embodiment which actuator unit 12 is removed from the conveyor frame 15 of the driving apparatus illustrated by FIG. 1, FIG. 4 is a bottom view of the actuator unit separated from the frame and FIG. 5 is a horizontal cut-away front view of the embodiment illustrated by FIG. 3. The belt 20 is loosened after separating the actuator unit from the frame as described hereinbefore and is removed from the frame 15, and the outer and rear surfaces of the belt are cleaned, then the determined portion of the frame and of the actuator unit is swept or is checked for the maintenance, thereafter they are assembled again to be used.

Figure 6:
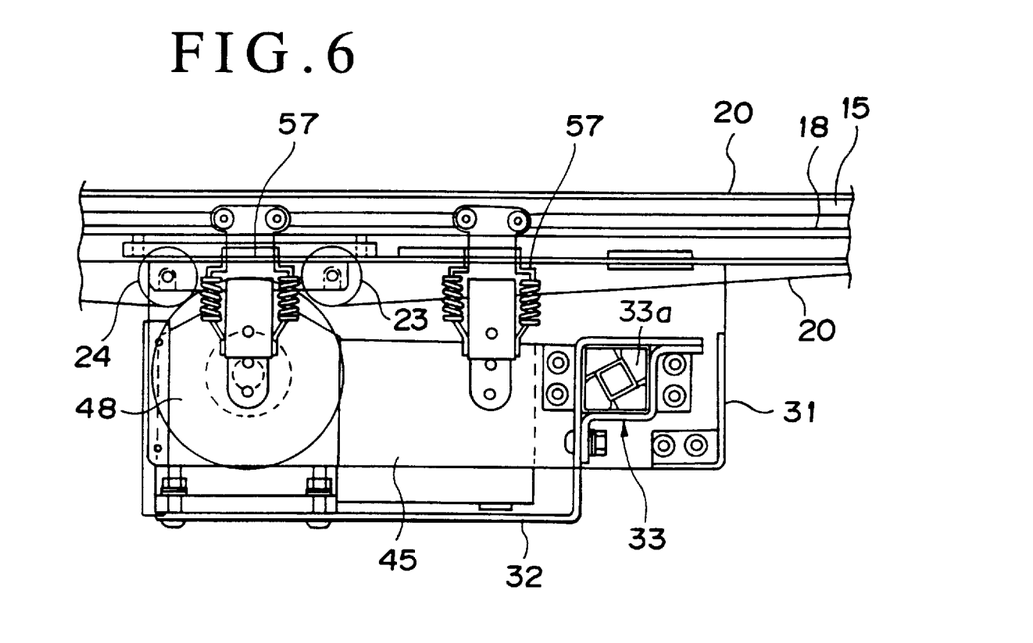
FIG. 6 is a side view of a driving part of the second embodiment of the apparatus.
Figure 7:
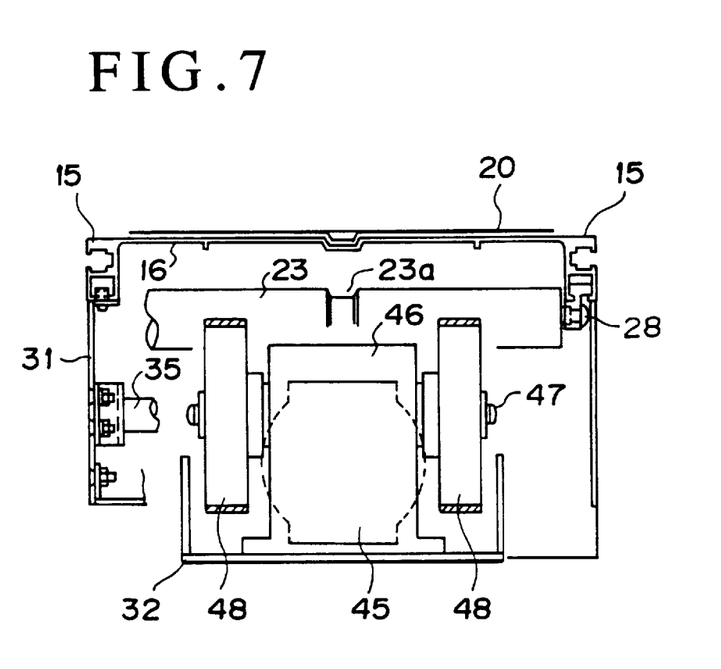
FIG. 7 is a horizontal cut-away front view of the embodiment shown in FIG. 6.
Figure 8:
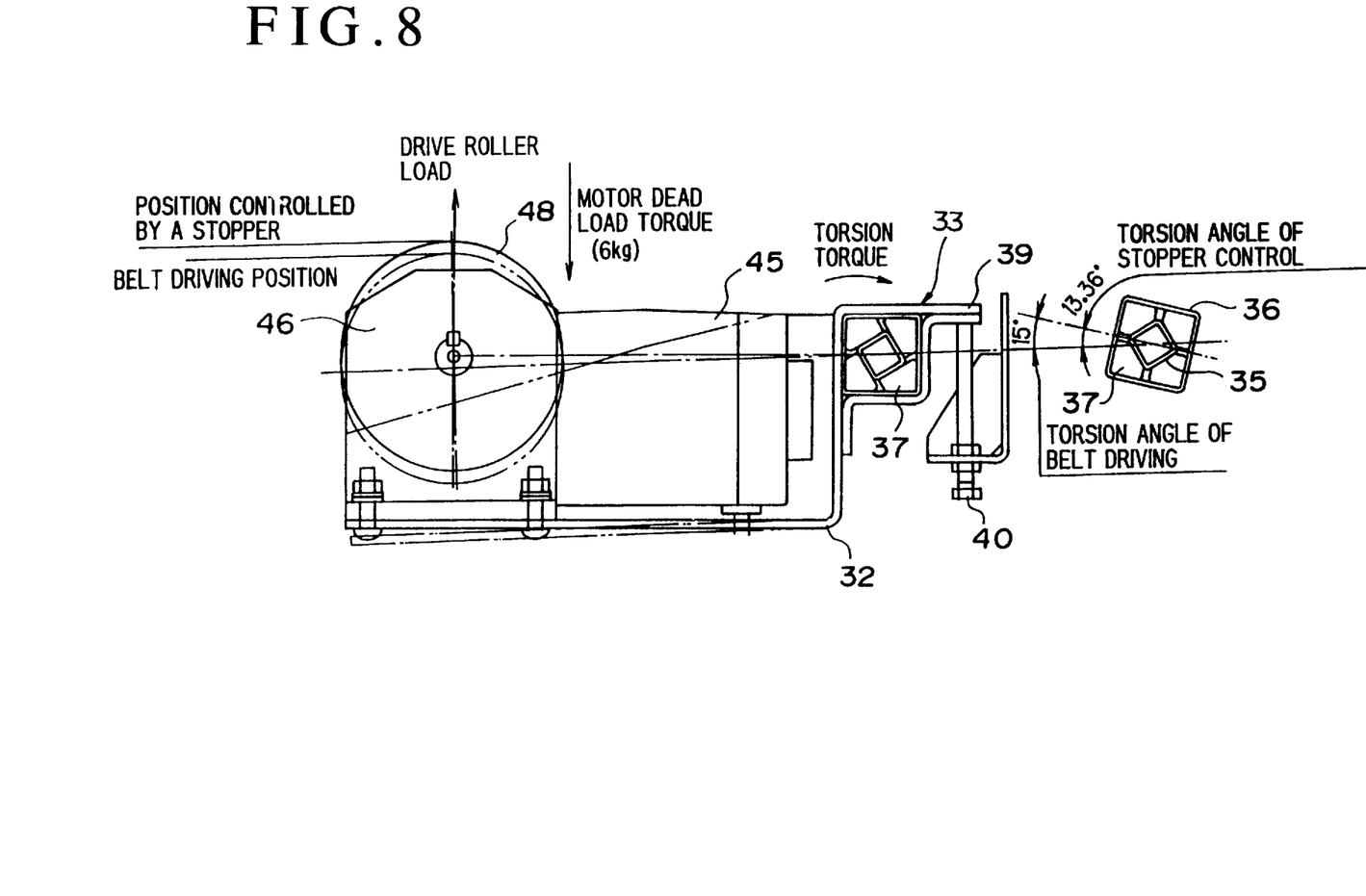
FIG. 8 is a side view of the actuator unit removed from the frame of the embodiment in FIG. 6.

FIG. 6 is a side view of the driving portion of the second embodiment and FIG. 7 is a horizontal cut-away front view of the apparatus illustrated by FIG. 6. FIG. 8 is a side view of the actuator unit removed from the apparatus illustrated by FIG. 6 In the actuator unit 12 of this embodiment, a motor 45 and a gear box 46 are mounted in a lengthwise direction of the movable frame body 32, rotating shafts 47, 47 are projected from left and right of the gear box 46 and drive pulleys 48, 48 are secured thereon, further several sets of catch clips 57, 57 having a spring and an engaging pawl are provided between the T groove 18 at the frame 15 side surface and the side plate 31a of the actuator unit 12 so that the frame and the actuator unit are detachably assembled with each other.

Figure 10:
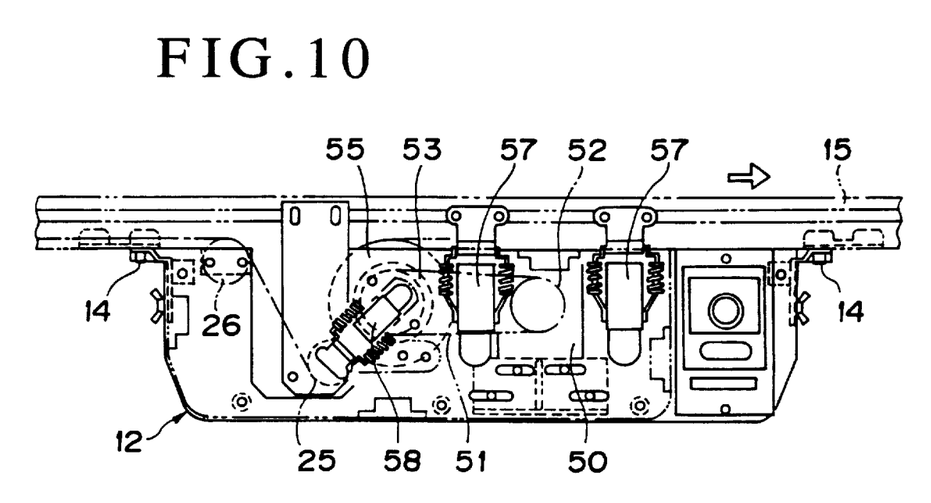
FIG. 10 is a side view of the fourth embodiment of the apparatus.

In case of the frame and the actuator unit being not assembled sufficiently by the catch clip 57 only, it is possible to fasten them by the screw 14 described in the first embodiment, further. A skeleton side view of the second embodiment of the apparatus is illustrated by FIG. 10 as same as the embodiment described hereinbefore.

The characteristic of the rubber spring will be described in Table 1.

TABLE 1

Examples illustrated by FIG. 2 and FIG. 3 (belt width: 100 mm)

| torsion angle | torsion torque | motor dead load torque | driving roller load |
|---|---|---|---|
| 10° | 75 kg - cm | - 27 kg - cm | 5.3 kg |
| 8° | 60 kg - cm | - 27 kg - cm | 3.7 kg |

Examples illustrated by FIG. 6 and FIG. 6 (belt width: 200 mm)

| torsion angle | torsion torque | motor dead load torque | driving roller load |
|---|---|---|---|
| 15° | 200 kg - cm | - 77 kg - cm | 7.0 kg |
| 18° | 260 kg - cm | - 77 kg - cm | 10.5 kg |

FIG. 9 illustrates a side view of the driving portion of the third embodiment, in which a flat spring 60 is used in place of the rubber spring of the apparatus of the second embodiment for elastically supporting a drive pulley 48. The flat spring illustrated therein is formed in L shape as shown from the side surface, which one edge 61 is secured to the support frame 31 of the actuator unit by a bolt 63 and the other edge 62 is formed at the free end side to load the motor 45 and the drive pulley 48. The size and the formation of the flat spring 60 is determined by a deflection stress formula based on a thickness, a width, an available length, Young's modulus and a load. In this embodiment, the belt 20 between inner pulleys 23, 24 and the drive pulley 48 is friction actuated with a certain torque by pressing the drive pulley 48 from the belt outside, and the products on the belt are transmitted. The drive pulley 48 is pressed to the belt side, and the take-up apparatus can be eliminated.

Figure 12:
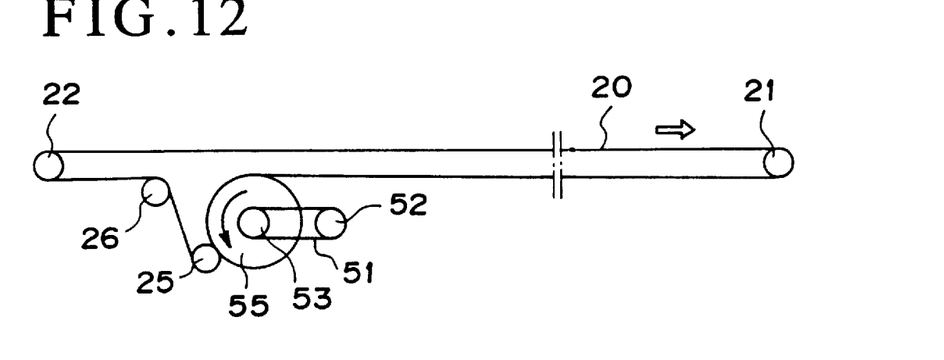
FIG. 12 is a skeleton side view of the fourth embodiment of the apparatus.

FIG. 10 is a side view of the driving portion of the fourth embodiment and FIG. 12 is a skeleton side view thereof. In this embodiment, the frame 15 and the actuator unit 12 are detachably assembled with each other by the screw 14 and the catch clip 57, however in the actuator unit 12, the rubber spring and the movable frame body such as shown in the former embodiment are not provided. Therefore a drive pulley 55 is pressed to the belt side by another catch clip 58.

That is, a speed reduction mechanism provided motor 50 and a drive pulley 55 are mounted in a supporting frame of the actuator unit 12. A chain 51 is set over a sprocket 52 of the output shaft of the speed reduction mechanism provided motor 50 and a sprocket 53 disposed on the drive pulley shaft. The inner pulley 25 and the pressing pulley 26 are provided on the frame 15 at where the actuator unit 12 is assembled. The inner pulley 25 is located at the oblique under portion of the drive pulley 55 to wind the belt in the range of almost angle of 135° in the peripheral surface of the drive pulley 55. To press the drive pulley 55 from the belt outside, a catch clip 58 to be a spring member is attached between the drive pulley 55 shaft and the side plate of the support frame with inclining almost 45° in respect of the vertical line including the drive pulley 55 axis line.

In the case described above, the belt 20 between the inner pulley 25 and the drive pulley 30 is also friction actuated with a certain torque by pressing the drive pulley 55 from the belt outside, and the products on the belt is transmitted toward the direction shown by an arrow illustrated in FIG. 10. The screw 14 and catch clips 57, 57 fastening the actuator unit 12 and the frame 15 are removed and the catch clip 58 is loosened, thereby the actuator unit 12 and the frame 15 can be separated from each other. In this embodiment, it is composed that the actuator unit 12 is fixed on the frame 15 by the catch clip 57 and the screw 14, while the screw 14 can be eliminated if they are assembled with having a sufficient strength by the catch clip 57 only, to the contrary, the catch clip 57 can be also eliminated if they are assembled with having a sufficient strength by the screw 14 only.

Figure 13:
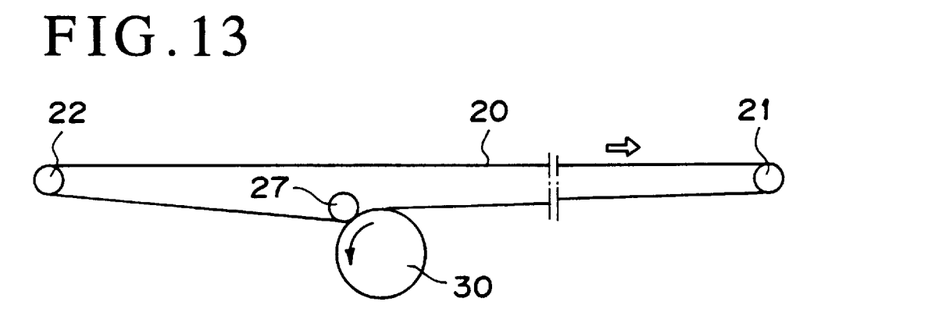
FIG. 13 is a skeleton side view of the fifth embodiment of the apparatus.

FIG. 13 is a skeleton cross section view of the fifth embodiment of the invention, one inner pulley 27 is provided on almost center of the frame under side and the belt 20 is held between this inner pulley 27 and the drive pulley 30 of the actuator unit 12.

Figure 14:
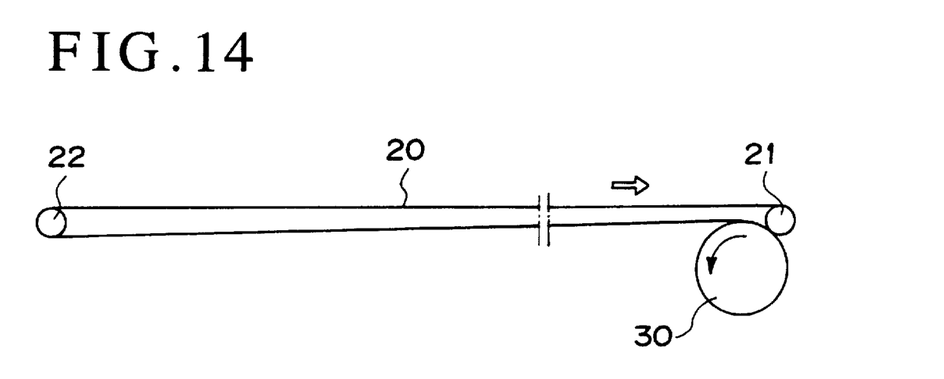
FIG. 14 is a skeleton side view of the sixth embodiment of the apparatus.

FIG. 14 is a skeleton side view of the sixth embodiment and the head pulley 21 on the frame tail end and the drive pulley 30 in the actuator unit 12 hold the belt 20, and the head pulley 21 also serves the inner pulley.

The seventh embodiment of the present invention will be described. FIG. 15 is an explanatory view illustrating a structure of the apparatus of the seventh embodiment, as shown by said FIG. 15, different from the first embodiment to the sixth embodiment which are described hereinbefore, the inner pulley is energized toward lower direction by an energy of the elasticity and the friction force is achieved between the inner pulley and the drive pulley, thereby the belt conveyor is actuated.

Figure 15A:
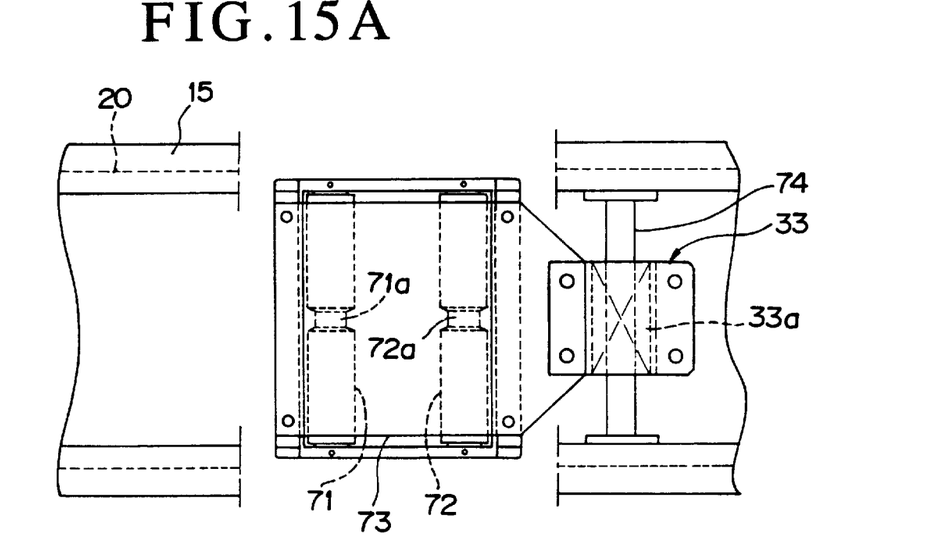
FIG. 15 is an explanatory view of the driving part of the belt conveyor of the seventh embodiment, (a) is a plan view of pressing means which frame portion is eliminated, (b) is side view thereof and (c) is a side view of pressing means.
Figure 15B:
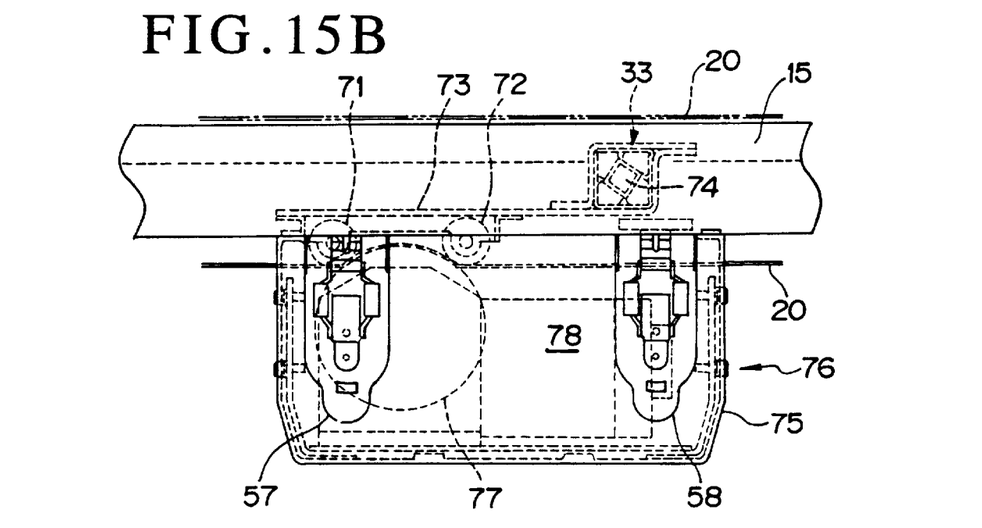
Figure 15C:
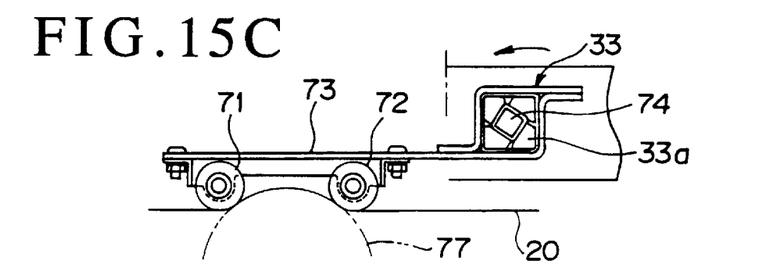

FIG. 15(a) is a plan view of the driving part of the belt conveyor described in the seventh embodiment, FIG. 15(b) is a side view thereof and FIG. 15 (c) is a side view of pressing means. As illustrated, in the apparatus, a support bar 74 is fixed between two frames 15 which are parallel disposed with each other and the rubber spring 33a is attached on the support bar 74 as pressing means 33. Concave grooves 71a, 72a are formed on the center portion of respective inner pulleys 71, 72 and each axis of inner pulleys is rotationally supported with a certain spaces at the under surface side of a plate 73 which axis is supported by the rubber spring 33a, and pulleys 72, 72 are pressed and energized toward the inner surface of the endless belt 20 of the returning side by an energy of the rubber spring 33a.

An actuator unit 76 contained in a support frame 75 having a cage shape is disposed at the lower side of the frame 15 and the actuator unit 76 comprises a drive pulley 77 to hold the endless belt 20 between inner pulleys 71, 72 and a motor 78 which axis is mounted on the center axis of the drive pulley 77 to transmit a rotating force. Catch clips 57, 58 are mounted at the side portion of the support frame 75 to detachably fix the support frame 75 to the frame 15, as same as illustrated by FIG. 6, the catch clip 57, 58 are pulled upward to release an engagement with the frame 15, thereby whole actuator unit 76 can be removed from the frame 15.

The function of the seventh embodiment will be described. As illustrated by FIG. 15(b), the actuator unit 76 is fixed on the frame 15, and the drive pulley 77 disposed inside of the actuator unit 76 is located at the beneath side of inner pulleys 71, 72, thereby the return side endless belt 20 is supported between the drive pulley 77 and inner pulleys 71, 72. Then as shown by FIG. 15(c), two inner pulleys 71, 72 are energized by the rubber spring 33a and are pressed downwardly. The drive pulley 77 is rotated in a condition that the endless belt 20 is held by a certain pressure, and the endless belt 20 is run by a friction force.

When the endless belt 20 surface is necessary to be cleaned, the catch clips 57, 58 are removed to detach whole support frame 75 of the actuator unit 76. Thereby the energy functioning between the drive pulley 77 and inner pulleys 71, 72 is released, and the endless belt 20 is loosened from inner pulleys 71, 72, then the head pulley 21 and the end pulley 22 are removed as illustrated by FIG. 1 and the endless belt 20 can be easily removed. After cleaning the endless belt 20, the belt can be attached again by a contrary procedure of the removing operation as described hereinbefore.

As described hereinbefore, in the seventh embodiment of the belt conveyor, it is different from other embodiments described hereinbefore in that the friction force is generated between inner pulleys and the drive pulley 77 by providing downward energy on the inner pulleys 71, 72 side, while the facility of detaching the belt can be also achieved as same as the other embodiment so that the endless belt 20 can be attached or detached by a simple operation of removing catch clips 57, 58, for example it is much available for a food products transmitting belt conveyor which needs a routine cleaning.

Figure 16A:
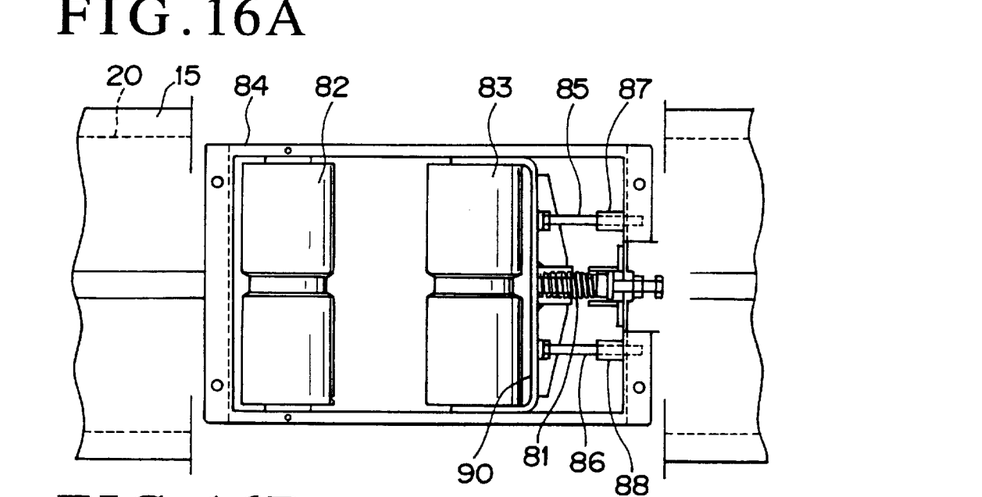
FIG. 16 is an explanatory view of the driving part of the belt conveyor of the eighth embodiment, (a) is a plan view of pressing means which frame portion is eliminated, (b) is side view thereof and (c) is a side view of pressing means.
Figure 16B:
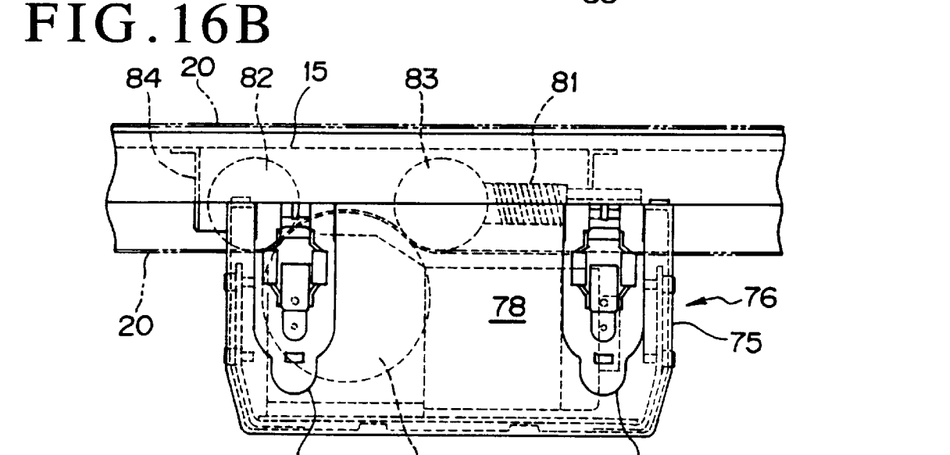
Figure 16C:
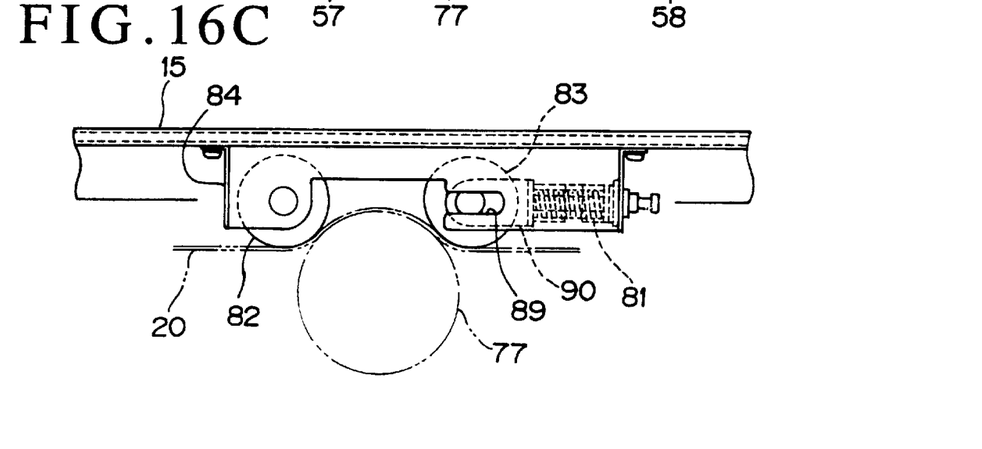

FIG. 16 illustrates a construction view of the belt conveyor of the eight embodiment in which FIG. 16(a) is a plan view, FIG. 16(b) is a side view, and FIG. 16(c) is a side view of pressing means. In the seventh embodiment, the friction force is generated between inner pulleys and the drive pulley 77 by the rubber spring 33a, while the eighth embodiment is different from the seventh embodiment in said friction force is generated between inner pulleys 82, 83 and the drive pulley 77 by a coil spring 81. That is an attaching frame 84 having a square shape is disposed at the under side of the frame 15 and one of inner pulleys 82 is rotationally mounted opposite to the attaching frame 84. Further a rotation axis of an another inner pulley 83 is contained in a U shape groove 89 which is formed on the lateral side of the support frame 84, and the inner pulley 83 can be rotated and be slid to the lateral direction also.

Further, the rotating axis end portion of the inner pulley 83 is axially fixed by a yoke 90 and a long edge of the yoke 90 is connected with the support frame 84 via a compression coil spring 81. Therefore the yoke 90 is slid to the horizontal direction in accordance with an expansion of the compression coil spring 81, thereby the inner pulley 83 is also slid along the U shape groove 89 of the support frame 84. Further as illustrated by FIG. 16(a), two guide bars 85, 86 are disposed on a long edge of the yoke 90 and are slidably penetrated into sockets 87, 88 formed on the support frame 84. As same as the seventh embodiment which is illustrated by FIG. 15, the actuator unit 76 is detachably mounted on the under side of the frame 15 by catch clips 57, 58.

In this embodiment, the support frame 75 of the actuator unit 76 is fixed on the frame 15, and the drive pulley 77 is just located between inner pulleys 82, 83, then the inner pulley 83 is pressed to the right side of the drawing by a pressure generated at the time of the attachment to slide the inner pulley 83 to the right direction by pressing the compression coil spring 81. Then the inner pulley 83 is energized toward the left direction by the compression coil spring 81 to press the drive pulley 77. Thereby the endless belt 20 of the return side is supported between two inner pulleys 82, 83 and the drive pulley 77. The drive pulley 77 is rotated to actuate the endless belt 20 by a friction force generated between pulleys. For removing the endless belt 20, whole actuator unit 76 is removed by releasing catch clips 57, 58, and the friction between inner pulleys 82, 83 and the endless belt 20 is released to enable of removing the endless belt easily.

Figure 17A:
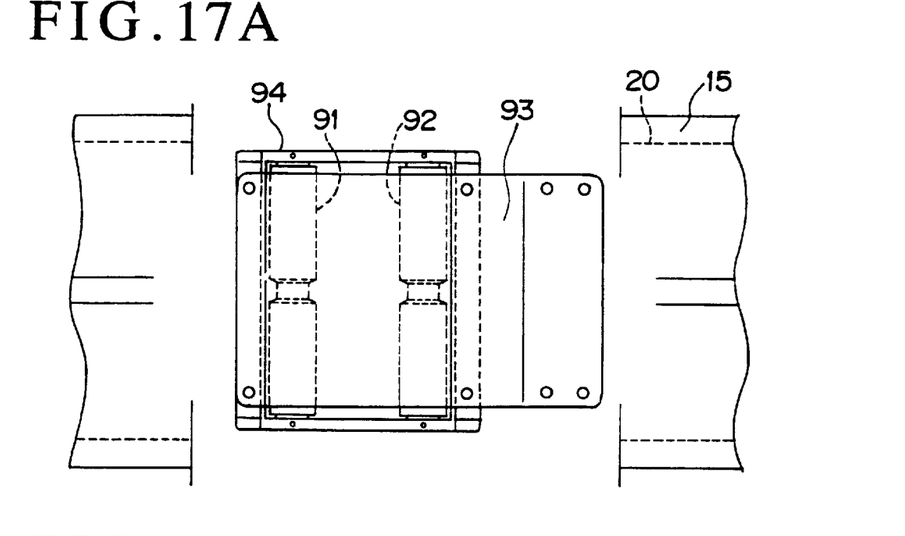
FIG. 17 is an explanatory view of the driving part of the belt conveyor of the ninth embodiment, (a) is a plan view of pressing means which frame portion is eliminated, (b) is side view thereof and (c) is a side view of pressing means.
Figure 17B:
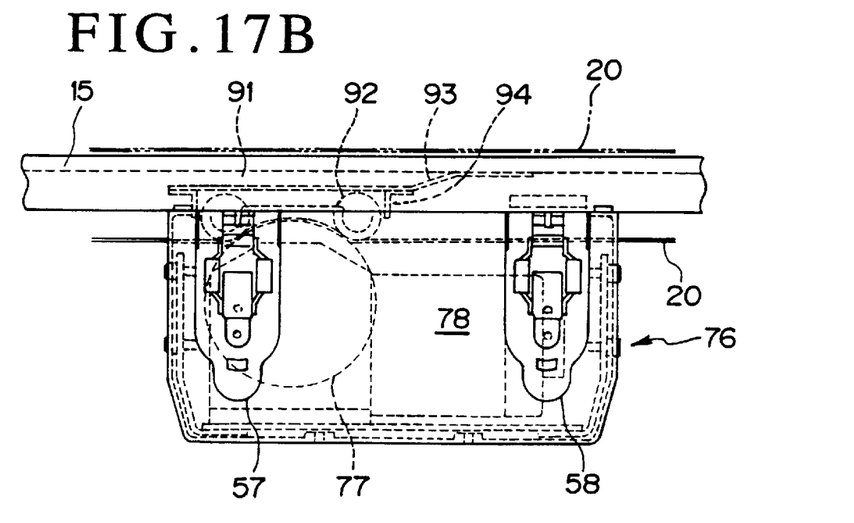
Figure 17C:
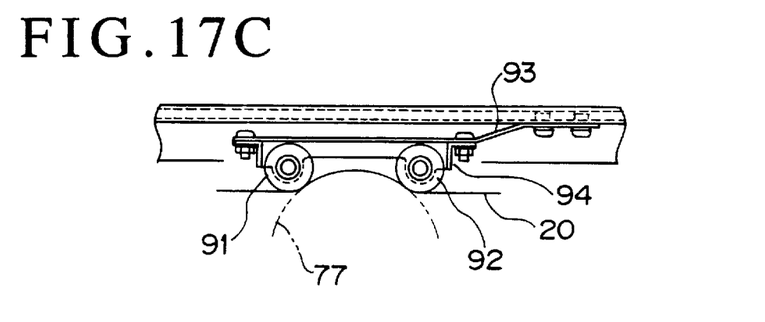

FIG. 17 illustrates composition view of the driving portion of the belt conveyor described in the ninth embodiment of the present invention in which FIG. 17(a) is a plan view, FIG. 17(b) is a side view and FIG. 17(c) is a side view of pressing means respectively. As illustrated, this embodiment is almost same as the seventh and the eighth embodiments, while is different from them in that a flat spring 93 is used for pressing means to energize inner pulleys 91, 92 toward downside. In this embodiment, the flat spring 93 is fixed on the frame 15 of the conveyor by a bolt or a nut and further a square shape support frame 94 is also fixed on the flat spring 93 by a bolt or a nut. Two inner pulleys 91, 92 are disposed on the support frame 94 with certain spaces. Therefore an upper directing force functions on inner pulleys 91, 92, the lower directing force is generated by an energy of the flat spring 93.

Now the actuator unit 76 is fixed on the frame 15 and the endless belt 20 of the return side is supported by the drive pulley 77 and two inner pulleys 91, 92 to generate the friction force, thereby the endless belt 20 is actuated due to the rotation of the drive pulley 77. As same as the seventh and the eighth embodiments, the endless belt 20 can be easily removed by releasing catch clips 57, 58.

In each embodiment illustrated by FIG. 15 to FIG. 17, the example that the actuator unit 76 is attached on the frame by using catch clips 57, 58 is respectively described, while leaving out of consideration in the facility of detachment and attachment, the actuator unit can be fixed on the frame by a bolt and a nut (not shown) without using the catch clip.

As described hereinbefore, in the present invention, the actuator unit of the belt is detachably mounted on the underside of the frame, the drive pulley to contact with the outer surface of the return side belt is disposed in the actuator unit, at least one of inner pulleys to contact with the inner surface of the return side belt is disposed under the frame at the position where the actuator unit is mounted, the belt held by the inner pulley and the drive pulley is friction actuated by pressing the drive pulley from the belt outside to the inner pulley side, thereby the actuator unit of the belt conveyor can be designed to be compact. In accordance with the present invention, the take-up apparatus can be eliminated so that the normal belt having less of belt tension can be used and an economic belt conveyor can be provided. Further in accordance with the present invention, the conveyor frame is detachably assembled with the actuator unit by several screws or catch clips, and the disassembling and the assembling can be so facilitated that after removing the belt from the frame, the maintenance check and the cleaning of the belt, the frame and the actuator unit can be facilitated.

We claim:

1. A driving apparatus for a compact belt conveyor, said driving apparatus comprising:

a frame having head and tail ends and a frame under side;

belt retainer members mounted on the frame head and tail ends;

an endless belt provided between the belt retainer members;

a pair of inner pulleys provided on the frame under side to have a predetermined space therebetween and contacting with a return side belt inner surface;

a belt actuator unit detachably provided at a determined attachment position that includes an attachment position of the inner pulleys of the frame under side and having a drive pulley contacting with a return side belt outer surface of the endless belt and a speed reduction mechanism provided with a motor to actuate the drive pulley; and pressing means for holding the endless belt between the inner pulleys and the drive pulley so as to elastically press the drive pulley against a side of the inner pulleys, the drive pulley being pressed and energized toward the side of the inner pulleys by a rubber spring and the belt held by the inner pulleys and the drive pulley being friction actuated by pressing the drive pulley from the belt outside.

2. The apparatus as claimed in claim 1, wherein the speed reduction mechanism and the drive pulley are disposed in the support frame of the actuator unit, a chain is provided between a sprocket of an output shaft of the speed reduction mechanism provided motor and a sprocket provided on the drive pulleys shaft, the inner pulley and the pressing pulley are provided on the frame at the position where the actuator unit is attached, the inner pulley is disposed at oblique under portion of the drive pulley to wind the belt in a range of almost angle of 135° around the periphery surface of the drive pulley, and catch clips are mounted between the drive pulley shaft and the side plate of the support frame with having an inclination of almost 45° in respect of a vertical line including the drive pulley shaft line to press the drive pulley from the belt outside, thereby the frame and the actuator unit are detachably assembled with each other.

3. A driving apparatus for a compact belt conveyor, said driving apparatus comprising:

a frame having head and tail ends and a frame under side;

belt retainer members mounted on the frame head and tail ends;

an endless belt provided between the belt retainer members;

a pair of inner pulleys provided on the frame under side to have a predetermined space therebetween and contacting with a return side belt inner surface;

a belt actuator unit detachably provided at a determined attachment position that includes an attachment position of the inner pulleys of the frame under side and having a drive pulley contacting with a return side belt outer surface of the endless belt and a speed reduction mechanism provided with a motor to actuate the drive pulley; and pressing means for holding the endless belt between the inner pulleys and the drive pulley so as to elastically press the drive pulley against a side of the inner pulleys, the actuator unit including a support frame detachable provided on the frame under side, a horizontal axis fixed in a direction orthogonal with the longitudinal direction of the frame in support frame, a movable frame body movably mounted in respect of the horizontal axis, the drive pulley being supported by the movable frame body to be pressed and contacted with the return side belt outer surface; in which the pressing means comprises elastic members mounted on the periphery of the horizontal axis to provide a torsion moment to the horizontal axis so as to energize the movable frame body to have a one direction rotating tendency and a frame body movably attached in respect of the horizontal axis via elastic members, thereby the drive pulley holding the belt by an elasticity of elastic members to always press and energize the belt to the inner pulley side.

4. The apparatus as claimed in claim 3, wherein head belt retainer and the tail belt retainer are respectively antirotational belt slip type guides which are fixed on or detachably provided into the frame end.

5. The apparatus as claimed in claim 3, wherein head belt retainer and the tail belt retainer are respectively pulleys which are supported on the frame end or detachably provided into the frame end.

6. The apparatus as claimed in claim 3, wherein the frame has left and right frame members with upper end portions connected by a slide bed.

7. The apparatus as claimed in claim 6, wherein a plurality of carrier rollers are disposed between the upper end portions of the left and right frame members.

8. The apparatus as claimed in claim 3, wherein the pressing means comprises the movable frame body having a rubber spring; the rubber spring comprises metal made square cylindrical inner and outer shells and a cylindrical shape rubber body, the inner shell is concentrically inserted into the outer shell with a condition of having a displacement of 45°, several of rubber bodies are pressed into the space of each edge of the inner shell and the corner portion of the outer shell, and the cylindrical rubber body is rotationally compressed.

9. The apparatus as claimed in claim 7, wherein the belt retainer, the carrier roller, the inner pulleys, the drive pulley and the slide bed respectively having concave grooves at their center and correspondingly a convex slip is provided at a center of the longitudinal direction of the endless belt rear surface to engage in the concave groove so as to prevent the snaking of the belt.

10. The apparatus as claimed in claim 9, wherein the actuator unit includes a motor and a gear box attached in a longitudinal direction of the movable frame body, rotation shafts projected from left and right of the gear box to fix the drive pulley, and several of catch clips having a spring and an engaging pawl are provided between T groove of the frame lateral side and a side plate of the actuator unit to achieve a construction that the frame and the actuator unit are detachably assembled with each other.

11. A driving apparatus for a compact belt conveyor, said driving apparatus comprising:

a frame having head and tail ends and a frame under side;

belt retainer members mounted on the frame head and tail ends;

an endless belt provided between the belt retainer members;

a pair of inner pulleys provided on the frame under side to have a predetermined space therebetween and contacting with a return side belt inner surface;

a belt actuator unit detachably provided at a determined attachment position that includes an attachment position of the inner pulleys of the frame under side and having a drive pulley contacting with a return side belt outer surface of the endless belt and a speed reduction mechanism provided with a motor to actuate the drive pulley; and pressing means for holding the endless belt between the inner pulleys and the drive pulley so as to elastically press the drive pulley against a side of the inner pulleys, the pressing means including a support frame detachably provided on the frame under side and an L shape flat spring fixed on the support frame head portion and having a horizontal edge and a vertical edge; and the drive pulley being loaded on a horizontal edge of the flat spring to hold the belt due to the spring elasticity and being always pressed and energized to the side of the inner pulleys.

* * * * *